(12) United States Patent
Kuwahara et al.

(10) Patent No.: US 7,396,902 B2
(45) Date of Patent: Jul. 8, 2008

(54) EPOXY RESIN CURING AGENT OF ALIPHATIC DIAMINE/STYRENE ADDITION PRODUCT

(75) Inventors: Hisayuki Kuwahara, Kanagawa (JP); Masatoshi Echigo, Kanagawa (JP); Takeshi Koyama, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 231 days.

(21) Appl. No.: 10/773,277

(22) Filed: Feb. 9, 2004

(65) Prior Publication Data
US 2004/0171770 A1 Sep. 2, 2004

(30) Foreign Application Priority Data
Feb. 13, 2003 (JP) ............................. 2003-035487

(51) Int. Cl.
C08G 59/50 (2006.01)
C08L 63/02 (2006.01)
C09K 3/00 (2006.01)

(52) U.S. Cl. .................. 528/392; 252/182.13; 525/523; 528/122; 528/124

(58) Field of Classification Search ........................ None
See application file for complete search history.

(56) References Cited

U.S. PATENT DOCUMENTS

| 3,376,344 | A | * | 4/1968 | Lane et al. .................. 564/368 |
| 4,034,040 | A | | 7/1977 | Cronin et al. ................ 424/316 |
| 4,177,174 | A | | 12/1979 | Hayashi et al. .............. 525/450 |
| 6,160,040 | A | | 12/2000 | Ghosh ........................ 523/404 |
| 6,562,934 | B2 | * | 5/2003 | Yonehama et al. ........... 528/122 |
| 6,908,982 | B2 | * | 6/2005 | Ichikawa et al. ............. 528/124 |
| 2002/0055605 | A1 | | 5/2002 | Yonehama et al. ........... 528/122 |
| 2004/0106684 | A1 | * | 6/2004 | Koyama et al. .............. 514/659 |

FOREIGN PATENT DOCUMENTS

| EP | 0 477 440 | 4/1992 |
| EP | 1 188 740 | 3/2002 |
| JP | 58103526 | 6/1983 |
| JP | 2004-18711 A | * 1/2004 |

OTHER PUBLICATIONS

CAPLUS accession No. 1990:425027 for the Kobunshi Ronbushi article by Tanaka et al., vol. 47, No. 2, 1990, abstract.*

* cited by examiner

*Primary Examiner*—Robert Sellers
(74) *Attorney, Agent, or Firm*—Wenderoth, Lind & Ponack, L.L.P.

(57) ABSTRACT

The epoxy resin curing agent of the present invention comprises a polyamino compound obtainable by addition reaction of aliphatic diamine represented by the formula (1) and styrene and a curing accelerator comprising an organic compound having at least one carboxyl group and at least one hydroxyl group within the molecule, which can achieve a low viscosity without containing environmental harmful substances such as phenol and solvents. In addition, the epoxy resin composition using said epoxy resin curing agent shows an excellent curability at low temperature and it provides a cured coating film having excellent appearance $$H_2N-H_2C\text{-}A\text{-}CH_2-NH_2 \qquad (1)$$

wherein A is a phenylene group or a cyclohexylene group.

9 Claims, No Drawings

EPOXY RESIN CURING AGENT OF ALIPHATIC DIAMINE/STYRENE ADDITION PRODUCT

BACKGROUND OF THE INVENTION

1) Field of the Invention

The present invention relates to a low-temperature curable epoxy resin curing agent comprising a polyamino compound and a curing accelerator, and an epoxy resin composition comprising said epoxy resin curing agent.

The epoxy resin curing agent is applicable to a curing agent for epoxy resin utilized in extremely wide fields including a field of coating materials such as an electrodeposition paint for motor vehicle, a corrosion-resistant paint for ships, bridges and a land and marine iron structure, and an inner surface coating paint for a beverage can; a field of materials for electricity and electronics such as a laminated sheet, a semiconductor sealant, an insulating powdered paint and a coil impregnant used in home electric appliances, communication facilities, a control system for automobiles and aircraft and the like; a field of materials for civil engineering and construction such as a material for quake-resistant reinforcement of bridges, a material for lining, reinforcement and repair of a concrete structure, a flooring material of a building, a lining of water supplying facility and sewerage, a pavior for waste water and permeating water; a field of an adhesive for vehicle and airplane, and a field of composite materials for airplane, industrial materials and sports equipment.

2) Related Art

It has widely been known that various amino compounds such as an aliphatic amino compound and an alicyclic amino compound are used as a curing agent for epoxy resin and a raw material thereof.

Among the aliphatic amino compounds, an aliphatic diamine represented by the following formula (1) has such features that, when it is used as a raw material of a curing agent, it provides a curable composition which can be cured quickly at low temperature and a cured product having an excellent chemical resistance.

$$H_2N-H_2C-A-CH_2-NH_2 \quad (1)$$

wherein A is a phenylene group or a cyclohexylene group

On the other hand, however, the diamine represented by the formula (1) easily produces carbamate by absorbing carbon dioxide or water vapor in the atmosphere which causes such defects that the phenomena of whitening or stickiness tends to appear on an epoxy resin cured coating film wherein the diamine is used as a curing agent.

Consequently, as a curing agent for epoxy resin, the diamine represented by the formula (1) is scarcely used as it is without modification. In most cases, they are used after various modifications.

Representative methods for modification of diamines include a modification by reaction with a compound having a carboxyl group, a modification by reaction with an epoxy compound, a modification by Mannich reaction with an aldehyde compound and a phenolic compound, a modification by Michael reaction with an acryl compound and the like.

Among these various methods for modification, a reaction product of Mannich reaction of an amino compound with an aldehyde compound and a phenolic compound has a feature that its curing speed is high. Especially, a reaction product of Mannich reaction of diamine represented by the formula (1) is widely utilized as an epoxy resin curing agent in the field wherein a low-temperature curability is required. (See "New Development Of A Curing Agent For Epoxy Resin" edited by Hiroshi Kakiuchi, published by CMC Co. Ltd., P 88, May 31, 1994)

In general, it is preferable that the viscosity of a curing agent is relatively low from the viewpoint of workability. Since a reaction product of Mannich reaction is a modified product of an amino compound with an aldehyde compound and a phenolic compound, it is possible to obtain a Mannich reaction product having a low viscosity by reducing the reaction mole ratio of the aldehyde compound to the amino compound or by increasing the reaction mole ratio of the phenolic compound to the amino compound. However, a relatively large amount of unreacted phenolic compound remains in a low-viscosity Mannich reaction product obtained by such modification.

At present, phenol is generally used as a raw-material phenolic compound of the Mannich reaction product. However, since phenol is designated as a poisonous substance and besides, its mutagenicity is identified, it has come to believe that unreacted phenol should not remain in the Mannich reaction product. Thus, a strong tendency not to use phenol has been developed recently.

In order to reduce the amount of unreacted phenol remained in the Mannich reaction product, a method such as increasing the reaction mole ratio of an aldehyde compound to an amino compound or decreasing the reaction mole ratio of a phenolic compound to an amino compound can be applied. However, the viscosity of a Mannich reaction product obtained by such methods becomes high. When the high-viscosity Mannich reaction product is used as a curing agent or a raw material thereof, it is necessary to dilute the product by adding a solvent in order to improve workability.

Recently, there is a strong tendency not to use solvents in an epoxy resin curing agent for a coating material in order to prevent the global environmental pollution, and it is desired to develop an epoxy resin curing agent which is available in a non-solvent condition.

An amino compound obtained by modifying metaxylylenediamine and the like is referred as an epoxy resin curing agent in Japanese Patent Kokai (Laid-open) No. 2002-161076, p 3-5, and it discloses that said amino compound has relatively low viscosity.

However, it is described in the above document that said amino compound, when it is used as an epoxy resin curing agent, has a long pot life at room temperature. Therefore, it is believed that, when said amino compound is used as a curing agent, curing reaction would not progress at low temperature.

SUMMARY OF THE INVENTION

An object of the present invention is to provide an epoxy resin curing agent using an amino compound having a low viscosity without containing environmental harmful substances such as phenol or solvent as a residual component in said amino compound, which can provide an epoxy resin cured product having an excellent curability at low temperature and an excellent appearance of a coating film.

As a result of extensive studies, the inventors have found that an epoxy resin composition obtained by using an epoxy resin curing agent comprising a polyamino compound obtainable by addition reaction of an aliphatic diamine represented by the formula (1) and styrene and a curing accelerator comprising an organic compound having at least one carboxyl group and at least one hydroxyl group within the molecule shows an excellent curability at low temperature and an excellent appearance of a cured coating film, and have accomplished the present invention.

That is, the present invention provides an epoxy resin curing agent described in the following 1) to 4), an epoxy resin composition described in 5), and an epoxy resin cured product described in 6).

1) An epoxy resin curing agent which comprises a polyamino compound obtainable by addition reaction of aliphatic diamine represented by the formula (1) and styrene and a curing accelerator comprising an organic compound having at least one carboxyl group and at least one hydroxyl group within the molecule.

$$H_2N—H_2C-A-CH_2—NH_2 \qquad (1)$$

wherein A is a phenylene group or a cyclohexylene group

2) The epoxy resin curing agent according to 1), wherein said organic compound is an aromatic compound having the carbon number of 7 to 12.
3) The epoxy resin curing agent according to 1), wherein said organic compound is salicylic acid.
4) The epoxy resin curing agent according to 1) to 3), wherein said polyamino compound contains less than 2% by weight of unreacted aliphatic diamine represented by the formula (1).
5) An epoxy resin composition comprising epoxy resin and the epoxy resin curing agent according to 1) to 4).
6) An epoxy resin cured product obtained by curing the epoxy resin composition according to 5).

DETAILED DESCRIPTION OF THE INVENTION

Example of the aliphatic diamine represented by the formula (1) to be used in the present invention include orthoxylylenediamine, metaxylylenediamine, paraxylylenediamine, 1,2-bis(aminomethyl) cyclohexane, 1,3-bis(aminomethyl) cyclohexane, and 1,4-bis(aminomethyl) cyclohexane, among which metaxylylenediamine and 1,3-bis(aminomethyl) cyclohexane are particularly preferable. Each of them may be used individually or plural of them may be used by mixing each other.

The polyamino compound of the present invention is a compound obtainable by addition reaction of aliphatic diamine represented by the formula (1) and styrene, and comprises a mixture of several addition products having different number of addition molecules and different addition structures each other as a main component.

Examples of the addition products having different number of addition molecules and different addition structures each other include ①a 1-addition product wherein 1 molecule of styrene is added to one primary amino group of 1 molecule of aliphatic diamine, ②a 2-addition product wherein 2 molecules of styrene are added to one primary amino group of 1 molecule of aliphatic diamine, ③a 2-addition product wherein 2 molecules of styrene are added to each of two primary amino groups of 1 molecule of aliphatic diamine respectively, ④a 3-addition product wherein 2 molecules of styrene are added to one primary amino group and 1 molecule of styrene is added to another primary amino group of 1 molecule of aliphatic diamine and ⑤a 4-addition product wherein 4 molecules of styrene are added to two primary amino groups of 1 molecule of aliphatic diamine.

It is preferable that the total content of 1-addition product and 2-addition product is 50% by weight or more, more preferably 70% by weight or more based upon the total weight of all kinds of addition products comprising in the polyamino compound obtained by addition reaction of aliphatic diamine and styrene.

In addition, the polyamino compound of the present invention comprises unreacted aliphatic diamine represented by the formula (1). The preferable content of the unreacted aliphatic diamine represented by the formula (1) in the polyamino compound is less than 2% by weight. Limiting the content of unreacted aliphatic diamine under 2% by weight makes it easier to prevent the epoxy resin composition from formation of carbamate or carbonate by absorbing carbon dioxide or water vapor in the atmosphere, to avoid the phenomena of whitening or stickiness of a coating film and to prevent the coating film from deteriorating of the appearance.

Preferable catalysts to be used in the process of synthesizing the addition product of aliphatic diamine represented by the formula (1) and styrene include any substances exhibiting strong basicity. Examples of such catalysts include alkaline metal, alkaline metal amide and alkylated alkaline metal. Among them, alkaline metal amide represented by the general formula MNRR' wherein M is an alkaline metal, N is nitrogen and R and R' are, each independently, hydrogen or an alkyl group, is preferable and lithium amide ($LiNH_2$) is more preferable.

After the completion of the reaction, the liquid reaction product thus obtained contains an addition product and a strong basic catalyst. It is possible to remove the catalyst from the reaction product by filtration after changing it to a readily removable salt thereof by adding acids such as hydrochloric acid, hydrogen chloride gas and acetic acid, alcohols such as methanol and ethanol or water.

When the content of unreacted aliphatic diamine in the polyamino compound to be used in the present invention is 2% by weight or more, it is possible to remove the unreacted aliphatic diamine so that the content of the unreacted aliphatic diamine becomes less than 2% by weight. The method for removing unreacted aliphatic diamine is not limited and it can be carried out by well known methods, among which removal by extraction is easy and preferable. The solvent used for extraction is not limited as long as the aliphatic diamine represented by the formula (1) is easily soluble and the reaction product of said aliphatic diamine and styrene is not soluble therein. The preferable solvent is water.

An organic compound to be used as a curing accelerator in the epoxy resin curing agent of the present invention is a compound having at least one carboxyl group and at least one hydroxyl group within the molecule. Usually, an amine-type curing accelerator such as triethylamine, DMP-10 and DMP-30, a curing accelerator having a hydroxyl group such as phenol and benzyl alcohol, or a curing accelerator having a carboxyl group such as formic acid are used as a curing accelerator for an epoxy resin curing agent. However, in order to achieve a sufficient improvement in curability at low temperature as intended in the present invention, it is necessary to use an organic compound having at least one carboxyl group and at least one hydroxyl group all together within the molecule as a curing accelerator.

Examples of the organic compound having at least one carboxyl group and at least one hydroxyl group within the molecule can be selected from the group consisting of an aliphatic compound having carbon number of 2 to 15, an alicyclic compound having carbon number of 2 to 15 and an aromatic compound having carbon number of 2 to 15. The preferable compound among them is an aromatic compound having carbon number of 2 to 15, more preferably 6 to 15, most preferably 7 to 12.

Examples of an aromatic compound having carbon number of 7 to 12 include salicylic acid, dihydroxy benzoic acid, trihydroxy benzoic acid, methyl salicylic acid, 2-hydroxy-3-isopropyl benzoic acid, hydroxy naphthoic acid, dihydroxy naphthoic acid and hydroxymethoxy naphthoic acid, among which salicylic acid is particularly preferable.

The amount of the curing accelerator to be added in the epoxy resin curing agent of the present invention is not limited as long as the property of the epoxy resin curing agent is not deteriorated.

The preferable content of the curing accelerator to be added in the epoxy resin curing agent of the present invention is 1 to 20% by weight, more preferably 4 to 15% by weight based upon the total weight of the polyamino compound and the curing accelerator.

When the content of the curing accelerator is less than 1% by weight, the reaction between the epoxy resin curing agent and epoxy resin does not progress sufficiently under the condition of low temperature. When the content of the curing accelerator is more than 20% by weight, the property of the obtainable epoxy resin composition may be deteriorated.

The curing accelerator to be used in the present invention may be consisting of the above-mentioned organic compound independently, or may be a mixture comprising the organic compound and other well known curing accelerators. Examples of other curing accelerators to be used in the present invention include a curing accelerator having a functional group such as an amino group, a hydroxyl group, or a carboxyl group within the molecule and a curing accelerator having at least two of the above functional groups within the molecule except for the above-mentioned organic compound, examples of which include a compound such as diethanolamine.

When other curing accelerators are used together with the above-mentioned organic compound, the content of the above-mentioned organic compound having at least one carboxyl group and at least one hydroxyl group within the molecule is preferably at least 30% by weight, more preferably at least 50% by weight based upon the total weight of the curing accelerator.

The epoxy resin curing agent of the present invention may be added in epoxy resin independently, or may be added as a mixture with other polyamine-type curing agents for epoxy resin.

In the case of using as a mixture with other curing agents, the mixing ratio of the epoxy resin curing agent of the present invention is preferably 20% by weight or more, more preferably 30% by weight or more based upon the total weight of the epoxy resin curing agent of the present invention and other polyamine-type epoxy resin curing agents. When the mixing ratio of the epoxy resin curing agent of the present invention is less than 20% by weight, it may cause the impairment of the characteristic of the epoxy resin curing agent of the present invention.

The epoxy resin composition of the present invention is comprising epoxy resin and an epoxy resin curing agent mentioned above.

Examples of epoxy resin used for an epoxy resin composition of the present invention include any epoxy resins having glycidyl groups which can react with active hydrogen atoms derived from amino groups of the epoxy resin curing agent of the present invention, and it is not limited.

Preferable examples of the epoxy resins include bisphenol A type epoxy resin and bisphenol F type epoxy resin which may be used independently or as a mixture with each other.

Further, other components for modification such as filler and plasticizer, components for adjusting fluidity such as a reactive or non-reactive diluent and a thixotropic agent, and other ingredients such as a pigment, a leveling agent, a tackifier, an anti-cissing agent, an anti-sag agent, an antifoaming agent, an ultraviolet absorber and a light stabilizer may be added to the epoxy resin composition of the present invention depending on the intended use.

The epoxy resin composition of the present invention can be cured by well known methods to obtain an epoxy resin cured product. The curing condition is not limited and it can be selected appropriately depending on the intended use. The epoxy resin composition of the present invention shows excellent curability and excellent appearance in the surface of a coating film when it is cured at low temperature of 0 to 15° C. as well as when it is cured at room temperature of 15 to 30° C.

PREFERRED EMBODIMENT OF THE INVENTION

The present invention will be described in more detail below, referring to Examples which are not intended to limit the scope of the present invention. Evaluation of the property of an epoxy resin coating film was carried out by the following methods.

[Evaluation of Property of Epoxy Resin Coating Film]

An epoxy resin composition was coated on a steel plate with a coating-film thickness of 200 µm under the conditions of 5° C. and 80% RH.

a) Appearance:

The appearance such as gloss, clarity and leveling of a coating film after 7 days of curing was evaluated visually. Dryness of a coating film after 16 hours, 1 day, 4 days and 7 days of curing were evaluated by touching with finger.

b) Water Resistance:

Water droplets were placed on a coating film after 16 hours, 1 day, 4 days, and 7 days of curing. After leaving 1 day, the condition of the coating film was evaluated visually. Evaluation was carried out based on the following 4 stages of criteria.

◎; Excellent, ○; good Δ; fair X; poor

EXAMPLE OF SYNTHESIS 1

817.2 g (6.0 mol) of metaxylylenediamine, manufactured by Mitsubishi Gas Chemical Co., Inc., in Japan (hereinafter, "MXDA") and 2.9 g (0.13 mol) of lithium amide, a reagent manufactured by Merck Ltd., were charged to a flask having internal volume of 2 L (liter) equipped with an agitator, a thermometer, a nitrogen gas inlet, a dropping funnel and a condenser.

Then, its temperature was raised to 80° C. in a nitrogen gas stream with stirring. After raising the temperature, 625.2 g (6.0 mol) of styrene, a special grade reagent, manufactured by Wako Pure Chemical Industries, Ltd., in Japan was added thereto dropwise over 2 hours. After the completion of dropwise addition, its temperature was maintained at 80° C. for 1 hour.

Then, 618.2 g of distilled water of 80° C. was added thereto. After stirring for 15 minutes, the reaction liquid was kept still for 5 minutes. The upper layer out of separated 2 layers of the liquid in flask was removed. The same amount of distilled water of 80° C. as mentioned above was added to the residual and the same operation was carried out again. After repeating the same operation for 7 times, distilled water dissolved in the lower layer was removed by vacuum distillation, whereby 1115.2 g of polyamino compound A was obtained.

The content of a 1-addition product was 58.1% by weight, the content of a 2-addition product was 37.4% by weight (a 2-addition product wherein 2 molecules of styrene are added to each of two primary amino groups of 1 molecule of aliphatic diamine respectively was 33.9% by weight, a 2-addition product wherein 2 molecules of styrene are added to one primary amino group of 1 molecule of aliphatic diamine was 3.5), and the content of 3-addition product was 3.8% by weight.

The content of unreacted MXDA in the polyamino compound A was 0.7% by weight base upon the total weight of the polyamino compound and its viscosity was 66 mPa·s/25° C.

EXAMPLE OF SYNTHESIS 2

681.2 g (4.0 mol) of isophoronediamine (hereinafter, "IPDA") was charged to a flask similar as the one used in Example of Synthesis 1. Then, its temperature was raised to 80° C. in a nitrogen gas stream with stirring. Keeping the temperature at 80° C., 186.0 g (0.5 mol) of bisphenol A type liquid epoxy resin with an epoxy equivalent weight of 186 g/eq, manufactured by Japan Epoxy Resins Co., Ltd., brand name; Epicoat 828, (hereinafter, "DGEBA") was added thereto dropwise over 2 hours. After the completion of dropwise addition, its temperature was raised to 100° C. and the reaction was carried out at 100° C. for 2 hours, whereby 860.1 g of an addition product of IPDA with DGEBA (polyamino compound B) was obtained. The viscosity of the addition product of IPDA with DGEBA was 2865 mPa·s/25° C. and its active hydrogen equivalent weight was 58.

EXAMPLE 1

190 g of polyamino compound A obtained in Example of Synthesis 1 was weighed and charged to a glass bottle with the volume of 240 ml. Then, 10 g of salicylic acid was added thereto and stirred for 3 hours at a temperature of 60° C. whereby 200 g of epoxy resin curing agent A was obtained. The viscosity of the epoxy resin curing agent A was 171 mPa·s/25° C.

The epoxy resin curing agent A was mixed with bisphenol A type liquid epoxy resin with an epoxy equivalent weight of 216 g/eq, manufactured by Japan Epoxy Resins Co., Ltd., brand name; Epikote 801, at a ratio shown in Table 1 to obtain an epoxy resin composition.

The epoxy resin composition thus obtained was cured under the conditions of 5° C. and 80% RH to prepare an epoxy resin cured coating film. The property of the epoxy resin cured coating film was evaluated and the result was shown in Table 1.

EXAMPLE 2

180 g of polyamino compound A obtained in Example of Synthesis 1 was weighed and charged to a glass bottle with the volume of 240 ml. Then, 20 g of salicylic acid was added thereto and stirred for 3 hours at a temperature of 60° C., whereby 200 g of epoxy resin curing agent B was obtained. The viscosity of the epoxy resin curing agent B was 537 mPa·s/25° C.

The epoxy resin curing agent B was mixed with bisphenol A type liquid epoxy resin with an epoxy equivalent weight of 216 g/eq, manufactured by Japan Epoxy Resins Co., Ltd., brand name; Epikote 801, at a ratio shown in Table 1 to obtain an epoxy resin composition.

The epoxy resin composition thus obtained was cured under the conditions of 5° C. and 80% RH to prepare an epoxy resin cured coating film. The property of the epoxy resin cured coating film was evaluated and the result was shown in Table 1.

COMPARATIVE EXAMPLE 1

The polyamino compound A obtained in Example of Synthesis 1 was used as it is as an epoxy resin curing agent C.

The epoxy resin curing agent C was mixed with bisphenol A type liquid epoxy resin with an epoxy equivalent weight of 216 g/eq, manufactured by Japan Epoxy Resins Co., Ltd., brand name; Epikote 801, at a ratio shown in Table 2 to obtain an epoxy resin composition.

The epoxy resin composition thus obtained was cured under the conditions of 5° C. and 80% RH to prepare an epoxy resin cured coating film. The property of the epoxy resin cured coating film was evaluated and the result was shown in Table 2.

COMPARATIVE EXAMPLE 2

190 g of polyamino compound A obtained in Example of Synthesis 1 was weighed and charged to a glass bottle with the volume of 240 ml. Then, 10 g of phenol was added thereto and stirred for 3 hours at a temperature of 60° C., whereby 200 g of epoxy resin curing agent D was obtained. The viscosity of the epoxy resin curing agent D was 94 mPa·s/25° C.

The epoxy resin curing agent D was mixed with bisphenol A type liquid epoxy resin with an epoxy equivalent weight of 216 g/eq, manufactured by Japan Epoxy Resins Co., Ltd., brand name; Epikote 801, at a ratio shown in Table 2 to obtain an epoxy resin composition.

The epoxy resin composition thus obtained was cured under the conditions of 5° C. and 80% RH to prepare an epoxy resin cured coating film. The property of the epoxy resin cured coating film was evaluated and the result was shown in Table 2.

COMPARATIVE EXAMPLE 3

190 g of polyamino compound A obtained in Example of Synthesis 1 was weighed and charged to a glass bottle with the volume of 240 ml. Then, 10 g of benzoic acid was added thereto and stirred for 3 hours at a temperature of 60° C., whereby 200 g of epoxy resin curing agent E was obtained. The viscosity of the epoxy resin curing agent E was 171 mPa·s/25° C.

The epoxy resin curing agent E was mixed with bisphenol A type liquid epoxy resin with an epoxy equivalent weight of 216 g/eq, manufactured by Japan Epoxy Resins Co., Ltd., brand name; Epikote 801, at a ratio shown in Table 2 to obtain an epoxy resin composition.

The epoxy resin composition thus obtained was cured under the conditions of 5° C. and 80% RH to prepare an epoxy resin cured coating film. The property of the epoxy resin cured coating film was evaluated and the result was shown in Table 2.

COMPARATIVE EXAMPLE 4

190 g of polyamino compound A obtained in Example of Synthesis 1 was weighed and charged to a glass bottle with the volume of 240 ml. Then, 10 g of diethanolamine was added thereto and stirred for 3 hours at a temperature of 60° C., whereby 200 g of epoxy resin curing agent F was obtained. The viscosity of the epoxy resin curing agent F was 102 mPa·s/25° C.

The epoxy resin curing agent F was mixed with bisphenol A type liquid epoxy resin with an epoxy equivalent weight of 216 g/eq, manufactured by Japan Epoxy Resins Co., Ltd., brand name; Epikote 801, at a ratio shown in Table 3 to obtain an epoxy resin composition.

The epoxy resin composition thus obtained was cured under the conditions of 5° C. and 80% RH to prepare an epoxy resin cured coating film. The property of the epoxy resin cured coating film was evaluated and the result was shown in Table 3.

COMPARATIVE EXAMPLE 5

170 g of polyamino compound B obtained in Example of Synthesis 2 was weighed and charged to a glass bottle with the volume of 240 ml. Then, 10 g of salicylic acid and 20 g of benzyl alcohol were added thereto and stirred for 3 hours at a temperature of 60° C., whereby 200 g of epoxy resin curing agent G was obtained. The viscosity of the epoxy resin curing agent G was 3250 mPa·s/25° C.

The epoxy resin curing agent G was mixed with bisphenol A type liquid epoxy resin with an epoxy equivalent weight of 216 g/eq, manufactured by Japan Epoxy Resins Co., Ltd., brand name; Epikote 801, at a ratio shown in Table 3 to obtain an epoxy resin composition.

The epoxy resin composition thus obtained was cured under the conditions of 5° C. and 80% RH to prepare an epoxy resin cured coating film. The property of the epoxy resin cured coating film was evaluated and the result was shown in Table 3.

TABLE 1

|  | Example 1 | Example 2 |
|---|---|---|
| Epoxy resin composition (g) |  |  |
| Epikote 801 | 100 | 100 |
| Epoxy Resin Curing Agent A | 50 |  |
| Epoxy Resin Curing Agent B |  | 53 |
| Property of a cured coating film |  |  |
| Appearance |  |  |
| Gloss | ◎ | ◎ |
| Clarity | ◎ | ◎ |
| Leveling | ◎ | ◎ |
| Dryness | Δ/◎/◎/◎ | ○/◎/◎/◎ |
| (16 hours/1day/4days/7days) |  |  |
| Water resistance | Δ/○/◎/◎ | ○/◎/◎/◎ |
| (16 hours/1day/4days/7days) |  |  |

TABLE 2

|  | Comparative Example 1 | Comparative Example 2 | Comparative Example 3 |
|---|---|---|---|
| Epoxy resin composition (g) |  |  |  |
| Epikote 801 | 100 | 100 | 100 |
| Epoxy Resin Curing Agent C | 48 |  |  |
| Epoxy Resin Curing Agent D |  | 50 |  |
| Epoxy Resin Curing Agent E |  |  | 50 |
| Property of a cured coating film |  |  |  |
| Appearance |  |  |  |
| Gloss | ◎ | ○ | ○ |
| Clarity | ◎ | Δ | Δ |
| Leveling | ◎ | ◎ | ◎ |
| Dryness | X/X/◎/◎ | X/X/◎/◎ | X/X/◎/◎ |
| (16 hours/1day/4days/7days) |  |  |  |
| Water resistance | X/Δ/◎/◎ | X/Δ/Δ/○ | X/Δ/◎/◎ |
| (16 hours/1day/4days/7days) |  |  |  |

TABLE 3

|  | Comparative Example 4 | Comparative Example 5 |
|---|---|---|
| Epoxy resin composition (g) |  |  |
| Epikote 801 | 100 | 100 |
| Epoxy Resin Curing Agent F | 50 |  |
| Epoxy Resin Curing Agent G |  | 32 |
| Property of a cured coating film |  |  |
| Appearance |  |  |
| Gloss | ◎ | Δ |
| Clarity | Δ | Δ |
| Leveling | ◎ | Δ |
| Dryness | X/Δ/◎/◎ | X/○/◎/◎ |
| (16 hours/1day/4days/7days) |  |  |
| Water resistance | X/X/○/◎ | X/Δ/○/○ |
| (16 hours/1day/4days/7days) |  |  |

As clear from the above Examples, the epoxy resin curing agent of the present invention can achieve a low viscosity without containing environmental harmful substances such as phenol and solvents. In addition, the epoxy resin composition using said epoxy resin curing agent shows an excellent curability at low temperature and it provides a cured coating film having excellent appearance.

What is claimed is:

1. An epoxy resin curing agent which comprises a polyamino compound obtained by addition reaction of aliphatic diamine represented by the formula (1) and styrene with the reaction molar ratio of 1:1, and a curing accelerator comprising an organic compound having at least one carboxyl group and at least one hydroxyl group within the molecule, wherein said polyamino compound contains less than 2% by weight of unreacted aliphatic diamine represented by the formula (1):

$$H_2N—H_2C-A-CH_2—NH_2 \qquad (1)$$

wherein A is a phenylene group or a cyclohexylene group.

2. The epoxy resin curing agent according to claim 1, wherein said organic compound is an aromatic compound having the carbon number of 7 to 12.

3. The epoxy resin curing agent according to claim 1, wherein said organic compound is salicylic acid.

4. An epoxy resin composition comprising epoxy resin and the epoxy resin curing agent according to claim 1.

5. An epoxy resin composition comprising epoxy resin and the epoxy resin curing agent according to claim 2.

6. An epoxy resin composition comprising epoxy resin and the epoxy resin curing agent according to claim 3.

7. An epoxy resin cured product obtained by curing the epoxy resin composition according to claim 4.

8. An epoxy resin cured product obtained by curing the epoxy resin composition according to claim 5.

9. An epoxy resin cured product obtained by curing the epoxy resin composition according to claim 6.

* * * * *